(12) United States Patent
Brankov (10) Patent No.: US 12,109,828 B2
(45) Date of Patent: Oct. 8, 2024

(54) DECORATIVE FLOOR COVERING PRODUCTION METHOD

(71) Applicant: TARKETT GDL, Lentzweiler (LU)

(72) Inventor: Igor Brankov, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 28 days.

(21) Appl. No.: 17/778,966

(22) PCT Filed: Dec. 7, 2020

(86) PCT No.: PCT/EP2020/084903
§ 371 (c)(1),
(2) Date: May 23, 2022

(87) PCT Pub. No.: WO2021/116026
PCT Pub. Date: Jun. 17, 2021

(65) Prior Publication Data
US 2022/0410606 A1     Dec. 29, 2022

(30) Foreign Application Priority Data

Dec. 12, 2019    (LU) ........................................ 101526

(51) Int. Cl.
*B41M 3/00*      (2006.01)
*B29C 48/08*      (2019.01)
(Continued)

(52) U.S. Cl.
CPC ............. *B41M 3/006* (2013.01); *B29C 48/08* (2019.02); *B29C 48/21* (2019.02); *B32B 7/14* (2013.01);
(Continued)

(58) Field of Classification Search
CPC ..... B41M 3/006; B41M 7/0081; B29C 48/08; B29C 48/21; B32B 7/14; B32B 27/08;
(Continued)

(56) References Cited

FOREIGN PATENT DOCUMENTS

| EP | 0411152 A1 * | 2/1990 | ............. B32B 33/00 |
| EP | 3173229 A1 | 11/2016 | |

(Continued)

OTHER PUBLICATIONS

International Search Report for corresponding application PCT/EP2020/084903 filed Dec. 7, 2020; Mail date Mar. 5, 2021.
(Continued)

*Primary Examiner* — Vishal I Patel
(74) *Attorney, Agent, or Firm* — CANTOR COLBURN LLP (57) ABSTRACT

A method for producing a decorative floor covering comprises digitally printing an adhesive on a printing substrate thus generating an adhesive layer forming an at least one-dimensionally patterned decorative motif. The adhesive is a radiation-curable composition, preferably essentially free from non-reactive solvents and/or from photoinitiator. The printing substrate includes one of a core structure and a wear layer. After the printing of the adhesive, the adhesive layer on the printing substrate is contacted with the other one of the core structure and the wear layer. The core structure and the wear layer are then attached to each other by electron-beam curing the adhesive layer between them.

20 Claims, 6 Drawing Sheets

(51) Int. Cl.
  *B29C 48/21* (2019.01)
  *B32B 7/14* (2006.01)
  *B32B 27/08* (2006.01)
  *B32B 27/30* (2006.01)
  *B32B 37/12* (2006.01)
  *B32B 38/00* (2006.01)
  *B41M 7/00* (2006.01)
  *E04F 15/10* (2006.01)
  *B29K 27/06* (2006.01)
  *B29L 31/00* (2006.01)

(52) U.S. Cl.
  CPC ............ *B32B 27/08* (2013.01); *B32B 27/304* (2013.01); *B32B 37/1292* (2013.01); *B32B 38/0004* (2013.01); *B32B 38/145* (2013.01); *B41M 7/0081* (2013.01); *E04F 15/105* (2013.01); *B29K 2027/06* (2013.01); *B29K 2995/0087* (2013.01); *B29L 2031/722* (2013.01); *B32B 2037/1253* (2013.01); *B32B 2250/03* (2013.01); *B32B 2255/10* (2013.01); *B32B 2255/26* (2013.01); *B32B 2307/554* (2013.01); *B32B 2327/06* (2013.01); *B32B 2471/00* (2013.01)

(58) Field of Classification Search
  CPC ............ B32B 27/304; B32B 37/1292; B32B 38/0004; B32B 38/145; B32B 2037/1253; B32B 2250/03; B32B 2255/10; B32B 2255/26; B32B 2307/554; E04F 15/105
  See application file for complete search history.

(56) References Cited

FOREIGN PATENT DOCUMENTS

FR          3010428 A1      3/2015
WO   WO-2018057602 A1 *   3/2018   ............ B29C 43/24

OTHER PUBLICATIONS

Written Opinion of the International Searching Authority for corresponding application PCT/EP2020/084903 filed Dec. 7, 2020; Mail date Mar. 5, 2021.

* cited by examiner

DECORATIVE FLOOR COVERING PRODUCTION METHOD

FIELD OF THE INVENTION

The invention generally relates to a method for producing a floor covering with a printed decor. It relates more particularly to such a method in which the decorative layer is sandwiched between the core structure, i.e. the structural support layer(s), of the floor covering and a transparent, or at least translucent, wear layer and serves at the same time as the adhesive that attaches the wear layer to the core structure.

BACKGROUND OF THE INVENTION

FR 3010428 A1 discloses a method for producing a resilient floor covering comprising a multilayer structure including a transparent wear layer, preferably consisting of polyvinylchloride (PVC) and/or polyurethane (PU) and/or a polyolefin, and a support layer consisting of a thermoplastic resin, preferably a polyvinylchloride (PVC) and/or polyolefin resin. A decorative layer is digitally printed onto the top surface of the support layer or the bottom surface of the wear layer using an inkjet printer operated with a solvent-free ink that can be cured by energy supply. This solvent-free ink layer is then cured by energy supply, in particular by UV radiation. At least one connecting layer, which consists of an emulsion of acrylic or urethane and/or an acrylic copolymer, is bonded to the cured solvent-free ink layer. This connecting layer serves as a connection between the cured solvent-free ink layer and the underside of the wear layer or the upper side of support layer. Indeed, a cured solvent-free ink layer is—according to the teaching of FR 3010428 A1—not chemically compatible with preferred polymer support layers and/or preferred polymer wear layers in a multilayer resilient floor covering, so that laminating such a cured solvent-free ink layer directly between such functional layers of the resilient floor covering would result in a rapid delamination of the resilient floor covering. Therefore, FR 3010428 A1 proposes to cover the cured decorative layer on the support layer, respectively the wear layer, with a connecting layer that is chemically compatible with the cured solvent-free ink layer and the wear layer, respectively the support layer, to which it is to be connected in the resilient floor covering.

EP 3 173 229 A1 relates to a method for producing a printed resilient floor covering. The method comprises digital printing of a decorative layer onto the top surface of a support layer or the bottom surface of a wear layer with a UV curable ink, UV curing the decorative layer; laminating the support layer and the transparent wear layer together so that the printed decorative layer is sandwiched between the support layer and the transparent wear layer. An alternative method also presented by EP 3 173 229 A1 comprises digitally printing a decorative layer onto a decorative layer support film with a UV curable ink, UV curing the printed decorative layer on the decorative layer support film; laminating a support layer, the decorative layer support film and a transparent wear layer together, so that the decorative layer support film with the printed decorative layer is sandwiched between the support layer and the transparent wear layer. The UV curing is carried out with UV LED sources having a spectral emission in the range of 345-420 nm, so that during lamination, the UV curable ink is still incompletely cured.

The present invention aims at proposing an alternative to the production methods of the prior art.

SUMMARY OF THE INVENTION

According to an aspect of the invention a method for producing a decorative floor covering comprises digitally printing an adhesive on a printing substrate thus generating an adhesive layer forming an at least one-dimensionally patterned decorative motif. The adhesive is a radiation-curable composition, preferably essentially free from non-reactive solvents (thus forming a so-called 100% solids formulation) and/or from photoinitiator. The printing substrate includes one of a core structure (i.e. a mono- or multi-layered structural core) and a wear layer. After the printing of the adhesive, the adhesive layer on the printing substrate is contacted with the other one of the core structure and the wear layer. The core structure and the wear layer are then attached to each other by electron-beam curing the adhesive layer between them. It is worthwhile noting that the electron-beam curing of the adhesive layer is effected across the layer(s) above and/or below the adhesive layer, e.g. across the wear layer, or across the core structure if the core structure is sufficiently transparent for the electron beam.

It should be noted that whereas a radiation-curable composition essentially free from non-reactive solvents may be preferred in some embodiments, an adhesive composition containing an organic solvent or water could be used in other embodiments of the invention. In such a case, the method may include a heating step to make the carrier or solvent evaporate before the electron-beam curing is effected.

The qualifier "decorative" is used herein to indicate that the motif remains visible in the final product when in use as intended and contributes to the outer appearance of the floor covering. The expression "at least one-dimensionally patterned" means that there is a variation (preferably including plural gradients and/or steps) of the decorative motif along at least one direction, the variation being noticeable to the naked human eye. Such a variation may include variations in colour, or modulation of the thickness of the adhesive. The decorative motif may be caused, partially or completely, by a contrast in appearance (e.g. in colour) between the adhesive layer and the printing substrate. As used herein, variations or contrast in colour shall include variations or contrast, respectively, in shading.

As used herein, the term "printing substrate" designates the substrate on which the adhesive is digitally printed, as it presents itself in the printing equipment. The printing substrate may be a monolayer or a multilayer assembly. In the latter case, only the outermost layer that is directly contacted with the adhesive needs to be compatible with the adhesive in terms of surface roughness, surface tension, chemical functionalities present on the surface, etc. Hereinafter, when the printing substrate comprises a multilayer assembly, the outermost layer that is directly contacted with the adhesive will be referred to as the "adhesive-receiving layer", for the sake of simplicity. Preferably, adhesive-receiving layer would be of white or neutral bright colour, i.e. having a lightness L*, as defined in the CIELAB colour space, greater than 80, preferably greater than 85 and even more preferably greater than 90. The adhesive-receiving layer preferably has a surface energy comprised in the interval between 15 mN/m and 60 mN/m, preferably in the interval from 20 mN/m to 50 mN/m and even more preferably in the interval from 25 mN/m to 40 mN/m. It preferably has a surface roughness $R_a$ of less than 0.5 μm, preferably of less than 0.3 μm and even more preferably of less than 0.2 μm. Preferably, it also has a surface roughness $R_z$ (measured according to ISO 4288: 1996) of less than 5 µm, preferably of less than 3 µm and even more preferably of less than 2 µm. The adhesive-receiving layer preferably has a gloss value at 60° comprised in the interval from 10 to 90, preferably in the interval from 20 to 80 and even more preferably in the interval from 25 to 75. The gloss value is measured according to EN ISO 2813:2014. The opacity of the adhesive-receiving layer could be greater than 90%, preferably greater than 95% and even more preferably greater than 97%. Opacity (of the adhesive-receiving layer) is measured according to DIN 53146. The opacity O is the ratio between the reflectance $R_0$ and the reflectivity $R\infty$: $O=R_0/R\infty$, wherein the reflectance $R_0$ is the reflectance of the adhesive-receiving layer over perfect black and the reflectivity $R\infty$ is the reflectance of the same adhesive-receiving layer on a pile of identical adhesive-receiving layers which is so thick that it is opaque. DIN 53145 defines the requisites for determining the reflectance $R_0$ and the reflectivity $R\infty$.

The printing substrate may include the core structure, in which case the other one of the core structure and the wear layer is the wear layer. Alternatively, the printing substrate includes the wear layer and the other one of the core structure and the wear layer is thus the core structure.

The method may include forming the core structure, the formation of the core structure comprising at least one of:
extrusion of a single plastic layer, the plastic layer being compatible with the adhesive;
coextrusion of at least two adjacent plastic layers, at least one of at least two adjacent plastic layers being compatible with the adhesive;
extrusion of a plastic layer or coextrusion of at least two plastic layers, followed by application of a plastisol coating thereon, the plastisol coating being compatible, after curing thereof, with the adhesive; and
extrusion of a plastic layer or coextrusion of at least two plastic layers, followed by application, e.g. by printing, of a primer layer thereon, the primer layer being compatible with the adhesive.

The method preferably includes the fixation of the at least one-dimensionally patterned decorative motif by incompletely precuring the adhesive layer before the printing substrate is contacted with the other one of the core structure and the wear layer. The precuring entails (polymerization and) crosslinking of the adhesive (and thus an increase of the viscosity) to an extent that the patterned decorative motif undergoes not smearing or blurring noticeable to the human eye when the adhesive layer becomes sandwiched between the core structure and the wear layer. However, the curing remains incomplete, such that a substantial proportion of reactive groups remain available for further (polymerization and) crosslinking, in particular, but not only, at the surface of the adhesive layer that is contacted with the other one of the core structure and the wear layer. In that way, when the curing is completed after the adhesive layer has been contacted with the other one of the core structure and the wear layer, a strong adhesion may be achieved between the core structure and the wear layer. The mechanisms of adhesion between the adhesive layer and the core structure as well as between the adhesive layer and the wear layer may be based on any of: covalent bonds, van der Waals forces, mechanical interlock (effected by infiltration of adhesive into recesses, pores, etc. of the adjacent layers followed by hardening of the adhesive), and any combination of these. Preferably, the adhesion relies on the formation of covalent bonds, during the e-beam curing, between reactive groups of the adhesive and reactive groups in the compositions of the adjacent layers. More preferably, the adhesion relies on the formation of such covalent bonds and on mechanical interlocking. As used herein, "incomplete curing" preferably refers to a degree of cure of at most 50%. The degree of cure can be measured by Fourier transform infrared spectrometry (FTIR) after exposure to the electron-beam radiation or by any other suitable method.

For a given adhesive composition, the degrees of cure and crosslinking finally achieved in the adhesive layer can be modified by acting, for example, on the radiation density or dose, i.e. the energy arriving at the surface per unit area (J/cm$^2$), the exposure time and the intensity of the electron beam. The radiation density corresponds to the radiation intensity (i.e. the power measured at the irradiated surface per unit area (W/cm$^2$)), integrated over the exposure time, i.e. the time during which a unit area of the surface of the adhesive layer to be cured is exposed to the electron beam. In the context of the present document, when reference is made to "completely curing", a degree of cure of at least 80%, preferably 85%, more preferably 90% and even more preferably 95%, is meant. When complete cure is reached, the cure rate induced by the electron beam levels out.

The adhesive may be substantially free from photoinitiator. In this context, "substantially free" means that the content in photoinitiator is significantly below the amount that would be used in case of UV-curing was intended, e.g. below 2 wt. %, preferably below 1 wt. % and more preferably below 0.5 wt. % of the adhesive composition. Preferably, the content in photoinitiator would be below the detection limits of the standard testing procedures.

The decorative motif is preferably at least two-dimensionally patterned, i.e. has variations in at least two perpendicular directions. The decorative motif could also be three-dimensionally patterned by digital 3D printing of the adhesive.

An interesting advantage of the invention resides in the fact that the wear layer need no longer be applied to the core structure by hot lamination. Such hot lamination, typically taking place at temperatures above 150° C., may cause distortion of the decorative motif unless the heating of the layers and the lamination process itself are carried out with great care. Furthermore, hot lamination is oftentimes the bottleneck of a production line. It will thus be appreciated that the digital printing of the adhesive, the contacting of the adhesive layer with the other one of the core structure and the wear layer and the attaching of the printing substrate and the other one of the core structure and the wear layer to each other are carried out at comparatively low temperatures, e.g. temperatures not exceeding 100 C, preferably not exceeding 60° C. It is worthwhile noting that the curing of the adhesive by electron beam(s) does not necessitate further heating of the core structure and the wear layer. Accordingly, the steps recited above could be carried out at ambient temperature—without excluding that the adhesive heats up during the curing when the reactions induced by the electron beam are exothermic. This implies that the constraints on the composition of the wear layer could be somewhat relaxed on certain aspects if the method of the invention is used: for instance, the wear layer could be one free from plasticizer or one containing plasticizer.

The at least one-dimensional patterning could be effected by digitally printing the adhesive in different colours. For printing, the adhesive could be made available in the primary colours of a suitable colour model, e.g. the CMYK (cyan, magenta, yellow, black) colour model.

According to a preferred embodiment, the core structure comprises one or more layers of rigid PVC (polyvinyl chloride) material. As used herein, the expression "rigid PVC" designates PVC material containing no or only small amounts of plasticizer(s), i.e. not more than 5 wt. %, preferably not more than 3 wt. %, more preferably not more than 2 wt. % and even more preferably not more than 1.5 wt. %, of the composition of the core structure.

The adhesive could comprise or consist of radiation-curable polyurethane and/or acrylate glue. Apart from the colorant(s), e.g. pigment(s) and/or dye(s), the adhesive could be free from non-reactive ingredients, i.e. ingredients that are not covalently integrated into the polymer matrix upon curing. Preferably also, the radiation-curable polyurethane and/or acrylate glue is free from photoinitiator.

The digital printing of the adhesive could include the printing of registration marks, preferably outside the trim area. These registration marks could be used in the production stages downstream of the digital printer, e.g. in an embossing stage, a cutting stage, a 3D printing stage, etc. The terms "downstream" and "upstream" are used herein to refer to relative positions on the production line, "downstream" meaning more towards the end of the production line and "upstream" the opposite direction.

The proposed method is considered compatible with mechanical embossing (in register), using an embossing tool (cylinder or plate) to create a three-dimensional structure in the wear layer. Alternatively, the method comprises digitally printing a three-dimensional transparent or at least translucent relief on the face of the wear layer turned away from the core structure. Preferably, the relief would be printed using an electron-beam-curable composition compatible with the wear layer. In this case, the curing of the relief and the (complete) curing of the adhesive layer could be achieved in the same curing stage.

The core structure and the wear layer may remain continuous at least up to the point where the digital printing of the three-dimensional relief is carried out. In this case, the three-dimensional relief is preferably registered with the motif formed by the adhesive layer thanks to the registration marks. Alternatively, the intermediate product formed by attaching the printing substrate and the other one of the core structure and the wear layer to each other is cut into slabs, panels, tiles, planks or the like, upstream of the point where the digital printing of the three-dimensional relief is effected. The cutting could be carried out, e.g., with a water jet or with a guillotine, taking any registration marks into consideration.

In the present document, the verb "comprise" and the expression "comprised of" are used as open transitional phrases meaning "consist at least of" or "include". The term "layer" designates one among plural sheets or thicknesses of material that make up the floor covering. Plural similar sheets or thicknesses assembled on top of one another could be considered a complex layer, provided that the assembly forms a functional unit. For instance, the wear layer could consist of a single sheet or a stack of sublayers. When the present document uses the words "top", "bottom", "above", "below" alone or in combination with another word in relation with the floor covering or an element thereof, reference is made to the orientation of the floor covering when used as finishing work, the decorative side facing upward. However, this is only to be taken as a naming convention in the context of the present document and must not be understood as implying that the invention be limited to the floor covering with that particular orientation. For example, the top surface of a layer may be oriented differently during the fabrication of the floor covering.

BRIEF DESCRIPTION OF THE DRAWINGS

By way of example, preferred, non-limiting embodiments of the invention will now be described in detail with reference to the accompanying drawings, in which.

DETAILED DESCRIPTION OF EMBODIMENTS

It will be understood that the following description and the drawings to which it refers describe by way of example several embodiment of the proposed invention for illustration purposes. This description of preferred embodiments shall not limit the scope, nature or spirit of the claimed subject matter.

Figure 1:
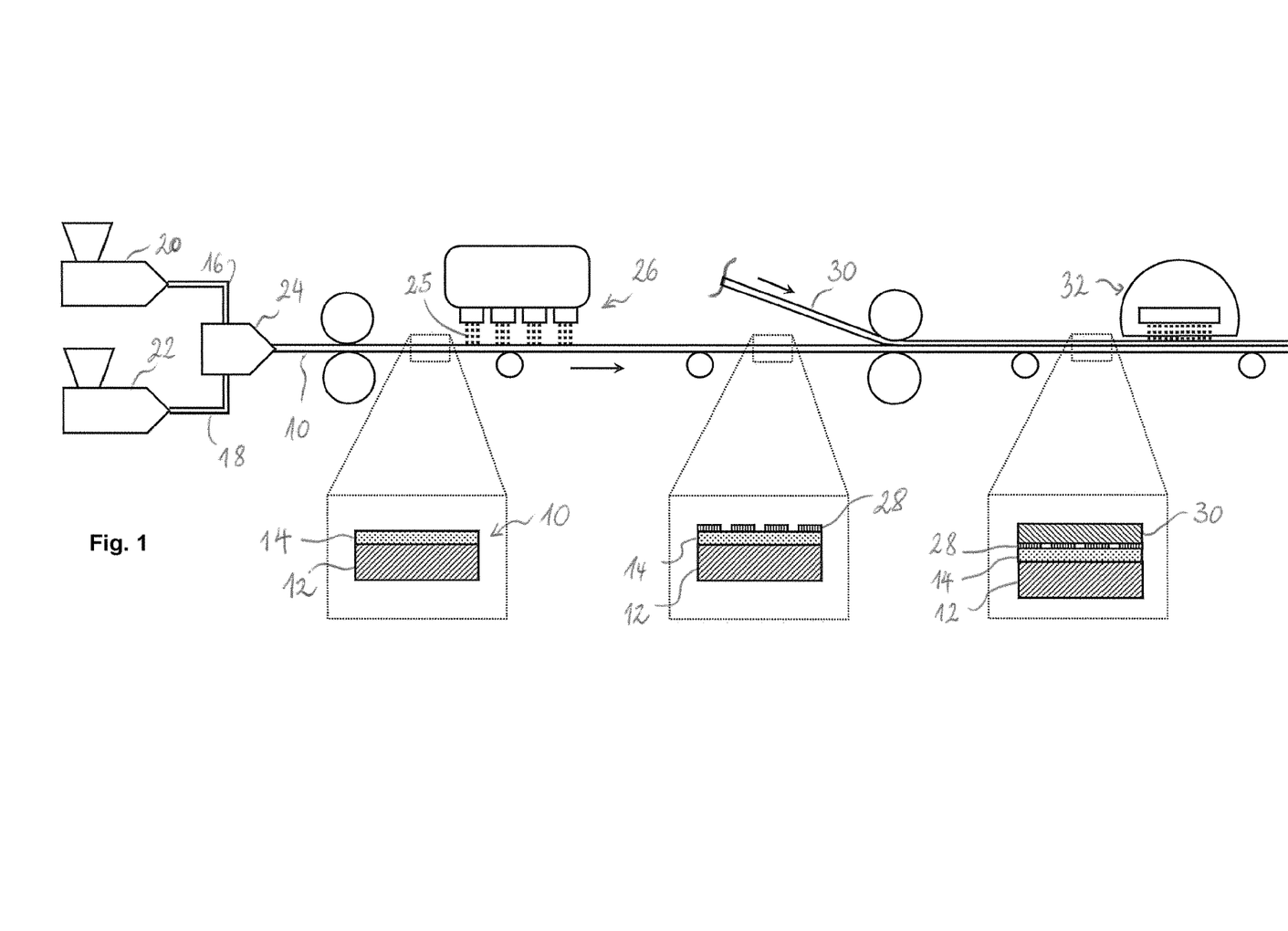
FIG. 1: is a schematic illustration of a production line for implementing a method of producing a decorative floor covering according to a first embodiment of the invention.

FIG. 1 illustrates a first embodiment of the proposed method for producing a decorative floor covering. A multi-layer printing substrate is provided in the form of a core structure 10 comprising a support layer 12 coextruded with an adhesive-receiving layer 14. Thermoplastic melt streams 16, 18 are guided from respective extruders 20, 22 to the co-extrusion die 24, where the printing substrate 10 is formed. The support layer 12 is illustrated in this example as a monolayer but it could be replaced by a multilayer structure, provided that the two-manifold die is replaced by a suitable multi-manifold die.

Downstream of the co-extrusion die 24, adhesive 25 is digitally printed on the printing substrate (here: core structure 10) using digital printing equipment 26, thus generating a one-, two- or three-dimensionally patterned adhesive layer 28 that forms a decorative motif. The adhesive 25 is an electron-beam-curable polyurethane (PU) and/or acrylate composition, free (or at least substantially free) from any photoinitiator.

After the printing of the adhesive, the adhesive layer 28 on the printing substrate is contacted with a wear (also: wear-resistant) layer 30. Upstream of the point where this contacting takes place, the printing substrate could go through a drying stage (not shown). Such drying may be recommended in specific embodiments of the method, for instance, if the adhesive includes a non-reactive solvent or carrier, e.g. water. Finally, the core structure 10 and the wear layer 30 are attached to each other by electron-beam curing the adhesive layer 28 between them. The electron-beam curing is carried out with an electron beam curing machine 32. Upon curing, the adhesive layer 28 takes the role of a tie layer firmly anchored to both the wear layer 30 and the core structure 10.

Figure 2:
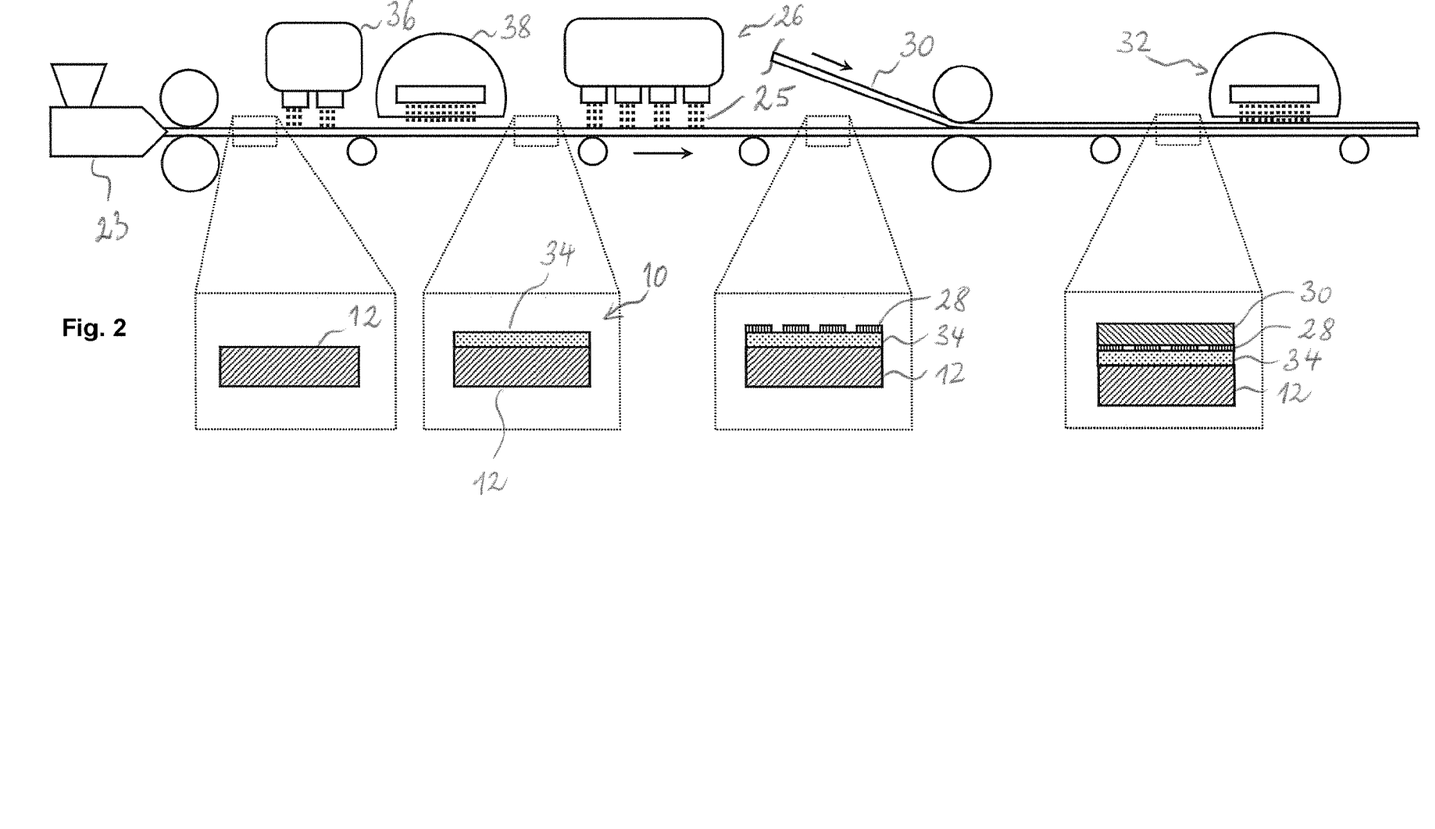
FIG. 2: is a schematic illustration of a production line for implementing a method of producing a decorative floor covering according to a second embodiment of the invention.

FIG. 2 illustrates a second embodiment of the proposed method for producing a decorative floor covering, which differs from the previously discussed embodiment by the way the printing substrate is produced. In the example of FIG. 2, a multilayer printing substrate is provided in the form of a core structure 10 comprising a support layer 12 and a primer layer 34 applied on top of the support layer 12 using a primer printing equipment 36.

The primer printing equipment 36 may be a digital printer but any other printing technique fit for the purpose of homogeneously applying the primer layer 34 could be used. When the primer layer 34 has been applied, it is preferably cured using a curing technique that is compatible with the primer composition employed. In the illustrated embodiment, the primer layer 34 is a photoinitiator-free electron-beam-curable composition that is cured with electron beam curing machine 38.

Downstream electron beam curing machine 38, adhesive 25 is digitally printed on the printing substrate using digital printing equipment 26, thus generating a one-, two- or three-dimensionally patterned adhesive layer 28 that forms a decorative motif. The adhesive 25 is an electron-beam-curable polyurethane and/or acrylate composition, free (or at least substantially free) from any photoinitiator.

After the printing of the adhesive, the adhesive layer 28 on the printing substrate is contacted with the wear layer 30. Finally, the core structure 10 and the wear layer 30 are attached to each other by electron-beam curing the adhesive layer 28 between them. The electron-beam curing is carried out with an electron beam curing machine 32. Upon curing, the adhesive layer 28 takes the role of a tie layer firmly anchored to both the wear layer 30 and the core structure 10.

Figure 3:
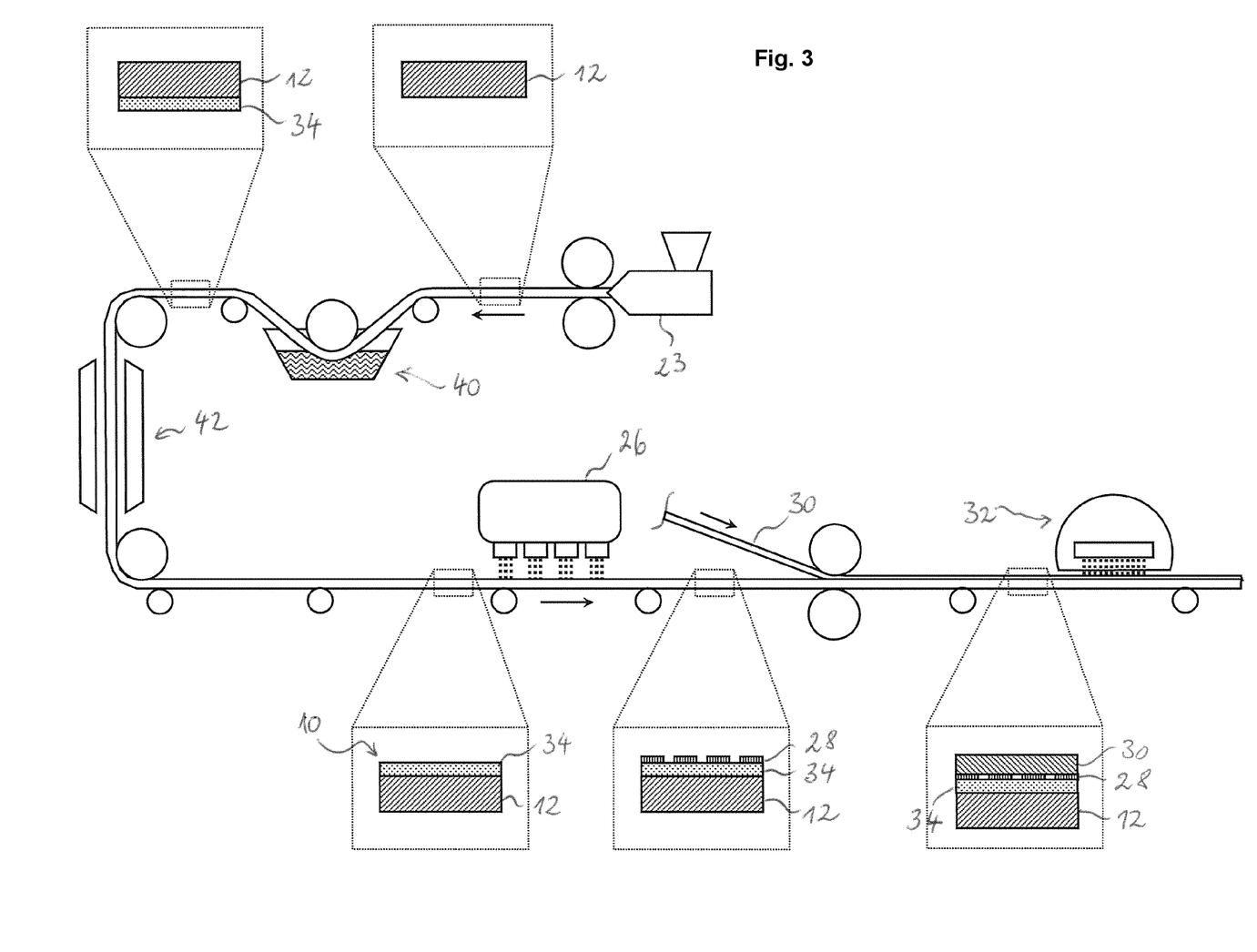
FIG. 3: is a schematic illustration of a production line for implementing a method of producing a decorative floor covering according to a third embodiment of the invention.

FIG. 3 illustrates a third embodiment of the proposed method for producing a decorative floor covering, which differs from the previously discussed embodiments only by the way the printing substrate is produced. In the example of FIG. 3, a multilayer printing substrate is provided in the form of a core structure 10 comprising a support layer 12 and a primer layer 34 applied on top of the support layer 12 using a primer application equipment 40. The primer is applied in liquid state (e.g. as a plastisol) by guiding the support layer 12 through a bath of primer liquid, which is thereafter solidified with drying/heating device 42.

The adhesive 25 is digitally printed on the printing substrate using digital printing equipment 26, thus generating a one-, two- or three-dimensionally patterned adhesive layer 28 that forms a decorative motif. The adhesive 25 is an electron-beam-curable polyurethane and/or acrylate composition, free (or at least substantially free) from any photoinitiator.

After the printing of the adhesive, the adhesive layer 28 on the printing substrate is contacted with the wear layer 30. Finally, the core structure 10 and the wear layer 30 are attached to each other by electron-beam curing the adhesive layer 28 between them. The electron-beam curing is carried out with an electron beam curing machine 32. Upon curing, the adhesive layer 28 takes the role of a tie layer firmly anchored to both the wear layer 30 and the core structure 10.

The support layer 12 is illustrated in FIGS. 2 and 3 as a monolayer provided by extruder 23. It could be replaced by a multilayer structure, provided that an appropriate extrusion system replaces extruder 23.

It may be worthwhile noting that, although FIGS. 1, 2 and 3 do not illustrate it, precuring the adhesive layer 28 by e-beam upstream of the point where the wear layer 30 is applied may be beneficial in order to avoid smearing of the decorative motif. Importantly, such precuring would be an incomplete curing, leaving a significant proportion of the initial reactive groups of the adhesive unaltered and thus available for further crosslinking. Such precuring would thus increase the viscosity of the adhesive but not transform it into a solid polymer. Furthermore, the precuring may lead to formation of covalent bonds between the adhesive and the printing substrate. Both effects may entail a reduction of the adhesive layer's proneness to smearing, if any. When the adhesive composition includes a carrier liquid or a solvent, instead of or in addition to the precuring, one could dry the adhesive composition upstream of the point where the wear layer 30 is applied.

Figure 4:
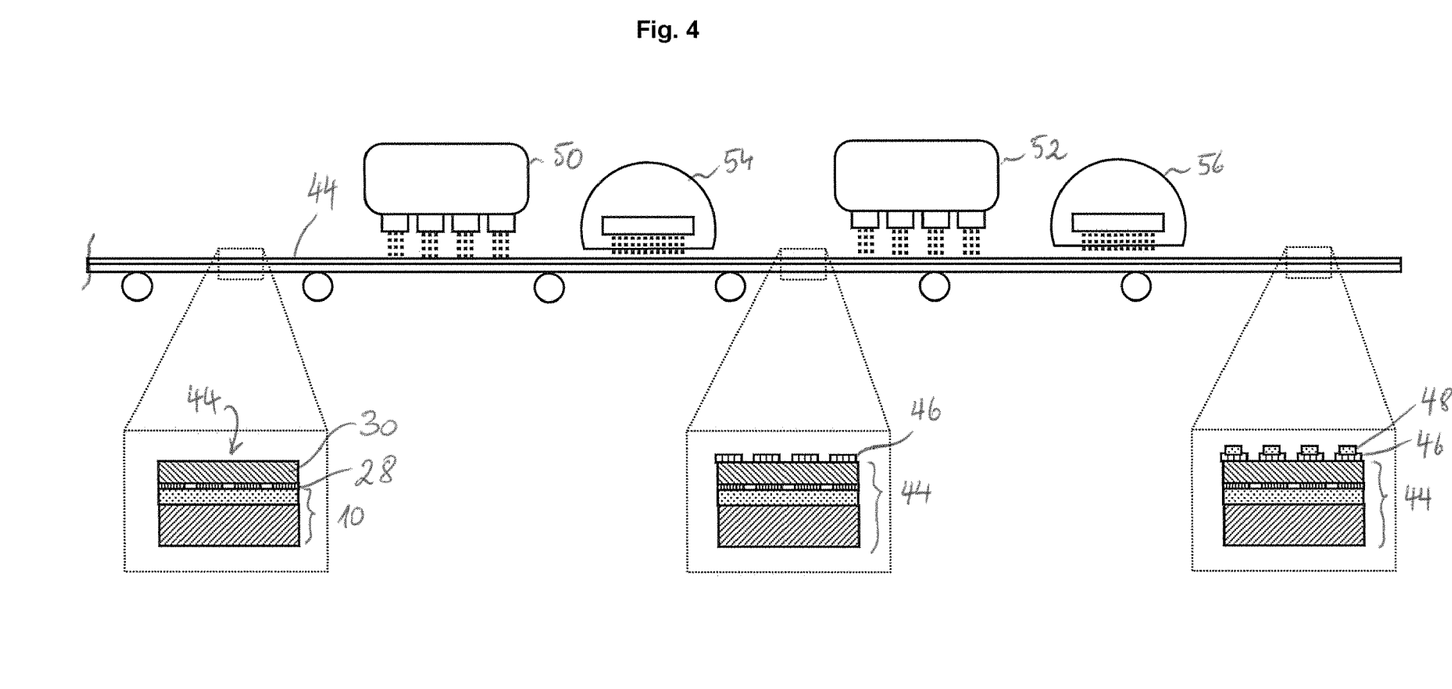
FIG. 4: illustrates a possible way of applying a relief on top of a decorative floor covering.

FIG. 4 illustrates the digital 3D printing of a relief on top of the wear layer 30. Such 3D printing could be carried out further downstream in the production lines illustrated in FIGS. 1 to 3. To print the relief, a transparent or at least translucent electron-beam-curable composition, compatible with the wear layer 30 and free of photoinitiator, is preferably used. The relief may be built up from multiple individual print layers, applied in register one after the other. In the illustrative example of FIG. 4, first 46 and second 48 layers of a polyurethane topcoat are printed, one after the other, on the assembly 44 of core structure 10, adhesive layer 28 and wear layer 30. The 3D printing is carried out using digital printers 50 and 52. After a printing stage, the newly deposited layer(s) of topcoat may be cured or precured in order to prepare these layer(s) for the deposition of further layer(s) of topcoat thereon. In the illustrated embodiment, intermediate curing of the topcoat layer 46 is effected with electron-beam curing machine 54 located downstream of printer 50 and the final curing is effected with electron-beam curing machine 56 located downstream of printer 52. The radiation dose applied during the final curing is chosen such that complete curing of all topcoat layers is achieved. Although FIG. 4 does not show it, the topcoat may comprise one or more continuous layers, so as to completely seal off the underlying wear layer 30 (and any intermediary topcoat layers). That remark is also valid for the embodiments described further below.

The printing of the topcoat layers 46, 48 is preferably carried out in register with the decorative motif of the adhesive layer 28. To achieve this, registration marks are preferably applied on the printing substrate when the adhesive layer 28 is printed. These registration marks can then be used in the production stages downstream, in particular in a 3D printing stage like the one illustrated in FIG. 4.

Figure 5:
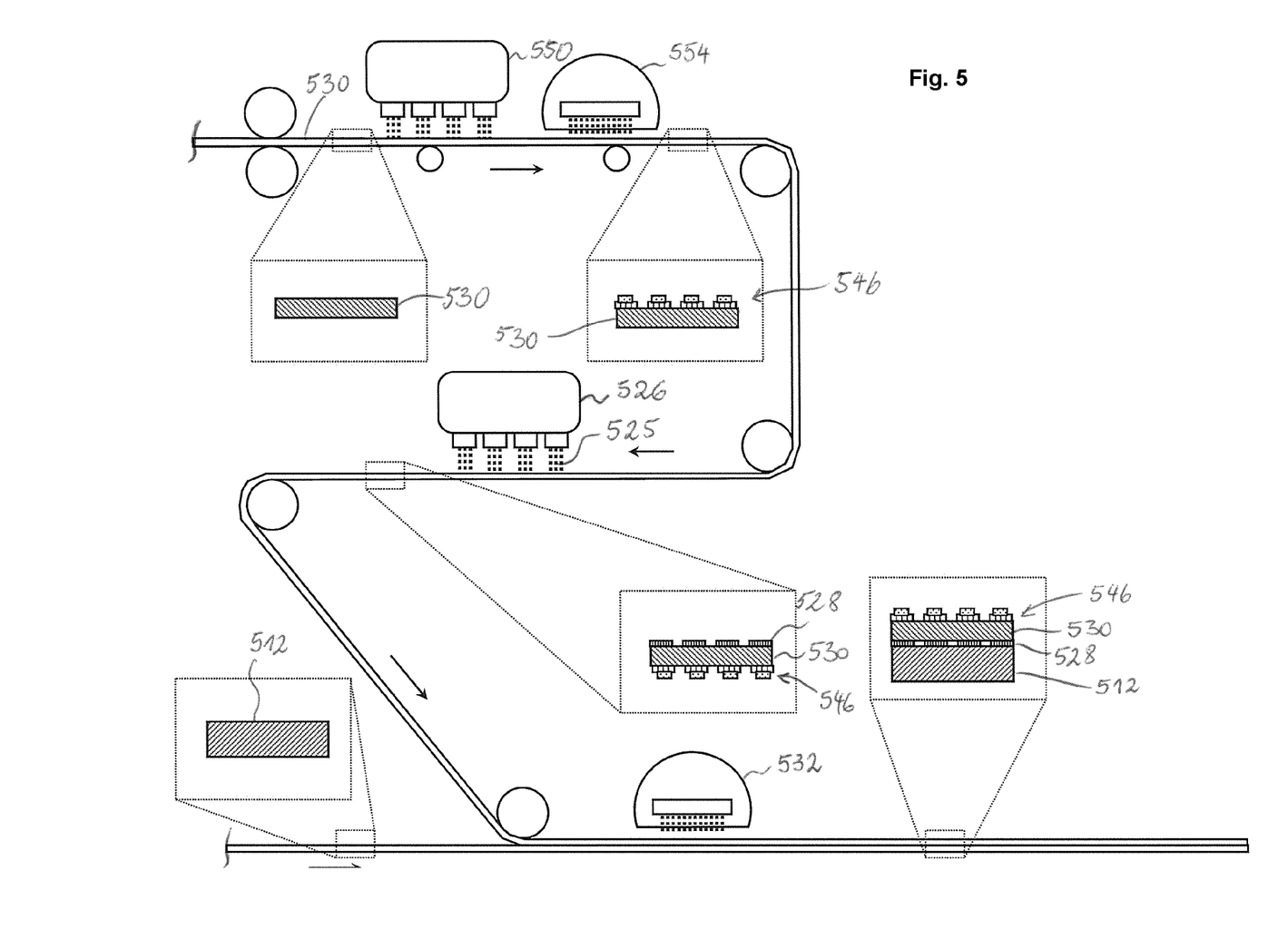
FIG. 5: is a schematic illustration of a production line for implementing a method of producing a decorative floor covering according to a fourth embodiment of the invention.

FIG. 5 illustrates a further embodiment of the proposed method for producing a decorative floor covering. The printing substrate for the adhesive layer 528 is in this case a wear layer 530. Further downstream the production line, the wear layer is assembled with the core structure, which is depicted as support layer 512. As shown in FIG. 5, a topcoat 546 comprising a 3D relief is digitally printed on the top side of wear layer 530 by 3D printing equipment 550 and cured with an electron-beam curing machine 554. The relief formation stage may include plural digital printers and intermediate curing machines but, for the sake of simplicity, FIG. 5 only shows one of each.

Downstream of the relief formation stage, adhesive 525 is digitally printed on the bottom side of the wear layer 530 using digital printing equipment 526, thus generating a one-, two- or three-dimensionally patterned adhesive layer 528 that forms a decorative motif. The adhesive 525 is an electron-beam-curable polyurethane and/or acrylate composition, free (or at least substantially free) from any photoinitiator.

After the printing of the adhesive, the adhesive layer 528 on the printing substrate is contacted with the support layer 512. Finally, the support layer 512 and the wear layer 530 are attached to each other by electron-beam curing the adhesive layer 528 between them. The electron-beam curing is carried out with an electron beam curing machine 532. Upon curing, the adhesive layer 528 takes the role of a tie layer firmly anchored to both the wear layer 530 and the support layer 512.

Figure 6:
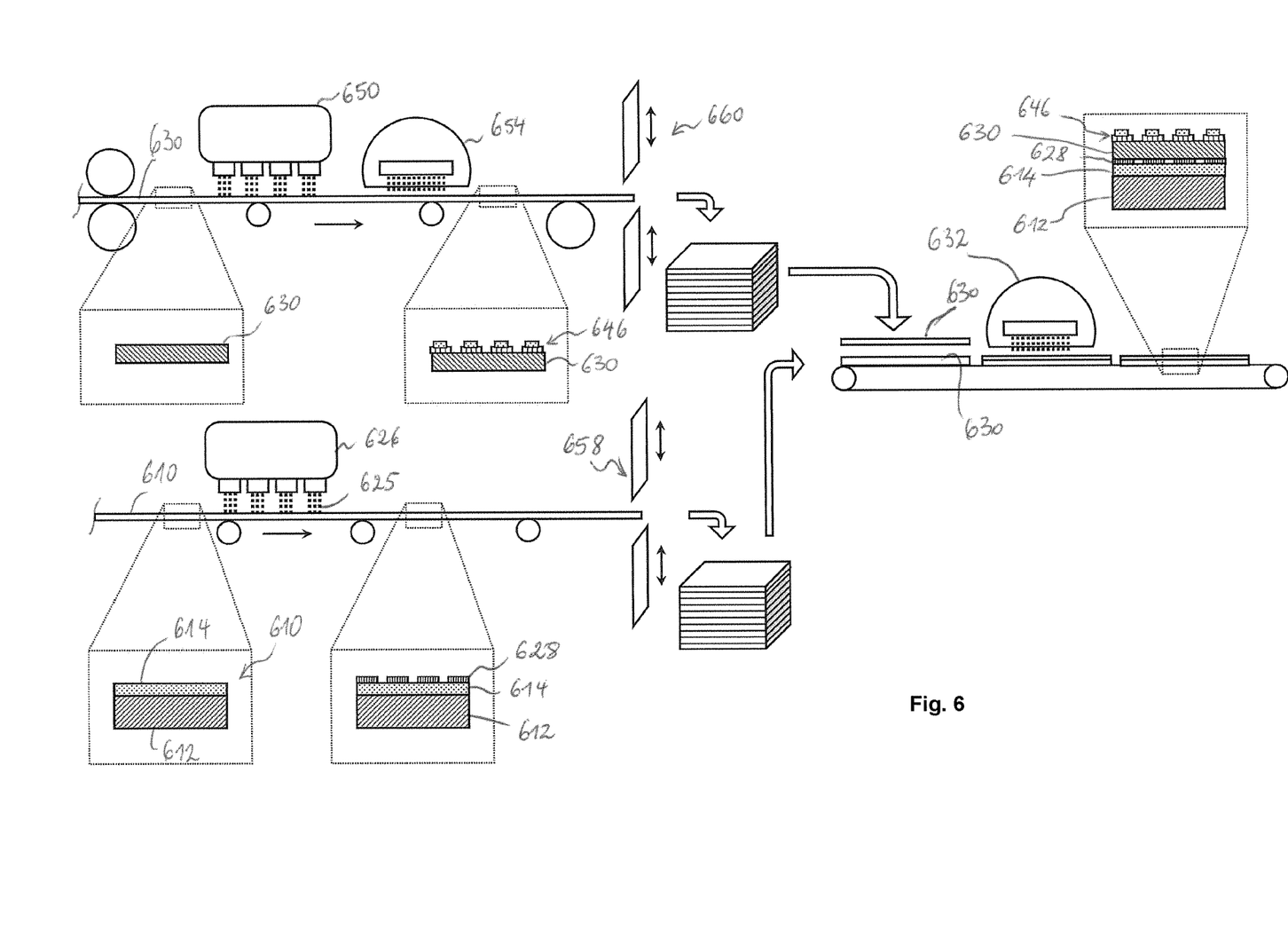
FIG. 6: is a schematic illustration of a production line for implementing a method of producing a decorative floor covering according to a fifth embodiment of the invention.

In the examples described above, the core structure and the wear layer remain continuous all along the illustrated part of the fabrication process. (Downstream cutting of the floor covering into slabs, panels, tiles, planks or the like is not illustrated but possible.) FIG. 6 schematically illustrates a production process, wherein the wear layer 630 and the core structure 610 are produced in separate production lines and cut into slabs, panels, tiles, planks or the like before being attached to each other. The cuts may be positioned precisely based on registration marks printed with the adhesive. In practice, that may be achieved by precisely timing the cutting with respect to an instant a registration mark is detected by a sensor at a specific position upstream of the cutting device.

The core structure comprises a support layer 612 and an adhesive-receiving layer 614. In a digital printing equipment 626, adhesive 625 is digitally printed on the core structure 610, in such a way that a one-, two- or three-dimensionally patterned adhesive layer 628 that forms a decorative motif is generated. The adhesive 625 is an electron-beam-curable polyurethane and/or acrylate composition, free (or at least substantially free) from any photoinitiator. Downstream of the digital printing equipment 626, the core structure 610 is cut into pieces using a guillotine 658 or another cutting device. Optionally (not shown in FIG. 6), the decorative motif is fixed by precuring the adhesive layer 628.

On a separate production line, a topcoat 646 including a relief is formed on top of the wear layer 630 using one or more digital 3D printers and one or more electron-beam curing machines 654. To print the relief, a transparent or at least translucent electron-beam-curable composition, compatible with the wear layer 630 and free of photoinitiator, is preferably used. The relief may be built up from multiple individual print layers, applied in register one with the other and with the decorative motif of the adhesive layer 628. The relief formation stage may include plural digital printers and intermediate curing machines but, for the sake of simplicity, FIG. 6 only shows one of each. Downstream of the curing machine 654, the wear layer 630 is cut into pieces using guillotine 660 or another cutting device.

The pieces of wear layer 630 and core structure 610 may be temporarily stored in respective storage areas. On an assembly line, the pieces of wear layer 630 are attached individually to the pieces of core structure 610 by electron-beam curing the adhesive layer 628 between them. The curing is carried out with an electron beam curing machine 632.

The process schematically depicted in FIG. 6 may be particularly suitable if the different production lines operate at different speeds. In a continuous process, the faster process steps would have to be slowed down to match the operating speed of the slowest process step (the bottleneck). This results in an inefficient use of the available resources. The process of FIG. 6 allows increasing the efficiency of the production plant by combining a higher number of slow production lines with a lower number of fast production lines.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method for producing a decorative floor covering, comprising:
   digitally printing an adhesive on a printing substrate thus generating an adhesive layer forming an at least one-dimensionally patterned decorative motif, the adhesive being a radiation-curable composition, the printing substrate including one of a core structure and a wear layer;
   contacting the adhesive layer on the printing substrate with the other one of said core structure and said wear layer;
   attaching the printing substrate and the other one of said core structure and said wear layer to each other by electron-beam curing said adhesive layer.

2. The method as claimed in claim 1, wherein the printing substrate includes said core structure and wherein the other one of said core structure and said wear layer is the wear layer.

3. The method as claimed in claim 1, wherein the printing substrate includes said wear layer and wherein the other one of said core structure and said wear layer is the core structure.

4. The method as claimed claim 1, comprising forming the core structure, the formation of the core structure comprising at least one of:
   a. extrusion of a single plastic layer, the plastic layer being compatible with said adhesive;
   b. coextrusion of at least two adjacent plastic layers, at least one of at least two adjacent plastic layers being compatible with said adhesive;
   c. extrusion of a plastic layer or coextrusion of at least two plastic layers, followed by application of a plastisol coating thereon, the plastisol coating being compatible, after curing, with said adhesive; and
   d. extrusion of a plastic layer or coextrusion of at least two plastic layers, followed by application of a primer layer thereon, the primer layer being compatible with said adhesive.

5. The method as claimed in claim 1, comprising fixation of the at least one-dimensionally patterned decorative motif by incompletely precuring the adhesive layer before the printing substrate is contacted with the other one of said core structure and said wear layer.

6. The method as claimed in claim 1, wherein the adhesive is substantially free from photoinitiator.

7. The method as claimed in claim 1, wherein the decorative motif is at least two-dimensionally patterned.

8. The method as claimed in claim 1, wherein the digital printing of the adhesive, the contacting of the adhesive layer with the other one of said core structure and said wear layer and the attaching of the printing substrate and the other one of said core structure and said wear layer to each other are carried out at temperatures not exceeding 100° C.

9. The method as claimed in claim 1, wherein the at least one-dimensional patterning is effected by digitally printing said adhesive in different colours.

10. The method as claimed in claim 1, wherein the core structure comprises one or more layers of rigid PVC material.

11. The method as claimed in claim 1, wherein the adhesive comprises or consists of at least one of radiation-curable polyurethane and acrylate glue.

12. The method as claimed in claim 1, wherein said digital printing of the adhesive includes the printing of registration marks.

13. The method as claimed in claim 1, further comprising digitally printing a three-dimensional transparent or at least translucent relief on a face of said wear layer turned away from the core structure.

14. The method as claimed in claim 13, wherein said core structure and said wear layer remain continuous at least up to where the digital printing of said three-dimensional relief is effected.

15. The method as claimed in claim 13, wherein an intermediate product formed by attaching the printing substrate and the other one of said core structure and said wear layer to each other is cut upstream of where the digital printing of said three-dimensional relief is effected.

16. The method as claimed in claim 15, wherein the cutting is carried out with a water jet or a guillotine.

17. A method of producing a decorative floor covering, comprising:
   providing a wear layer;
   providing an adhesive, the adhesive being a radiation-curable composition;
   forming a core structure, the formation of the core structure comprising at least one of:
   a. extrusion of a single plastic layer, the plastic layer being compatible with said adhesive;
   b. coextrusion of at least two adjacent plastic layers, at least one of at least two adjacent plastic layers being compatible with said adhesive;
   c. extrusion of a plastic layer or coextrusion of at least two plastic layers, followed by application of a plastisol coating thereon, the plastisol coating being compatible, after curing, with said adhesive; and
   d. extrusion of a plastic layer or coextrusion of at least two plastic layers, followed by application of a primer layer thereon, the primer layer being compatible with said adhesive;
   digitally printing the adhesive on a printing substrate thus generating an adhesive layer forming an at least one-dimensionally patterned decorative motif, the adhesive being a radiation-curable composition, the printing substrate including one of the core structure and the wear layer;
   contacting the adhesive layer on the printing substrate with the other one of said core structure and said wear layer; and
   attaching the printing substrate and the other one of said core structure and said wear layer to each other by electron-beam curing said adhesive layer.

18. The method as claimed in claim 17, wherein the adhesive comprises at least one of radiation-curable polyurethane and acrylate glue, and wherein the adhesive is substantially free from photoinitiator.

19. The method as claimed in claim 18, wherein the decorative motif is at least two-dimensionally patterned and wherein the at least two-dimensional patterning is effected by digitally printing said adhesive in different colors.

20. The method as claimed in claim 18, wherein the digital printing of the adhesive, the contacting of the adhesive layer with the other one of said core structure and said wear layer and the attaching of the printing substrate and the other one of said core structure and said wear layer to each other are carried out at temperatures not exceeding 100° C., and wherein said core structure and said wear layer are maintained continuous at least up to where the digital printing of said three-dimensional relief is effected.

* * * * *